Jan. 17, 1967     A. N. OPENSHAW     3,298,732
ADJUSTABLE COVERS FOR TRACTOR TRAILERS AND THE LIKE
Filed Oct. 20, 1965     2 Sheets-Sheet 1

INVENTOR
ALEXANDER N. OPENSHAW

ATTORNEYS

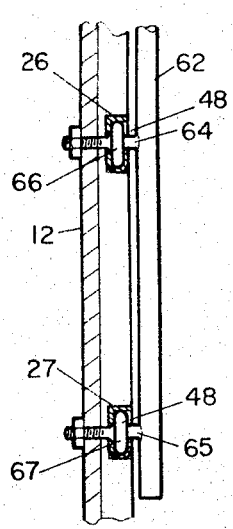
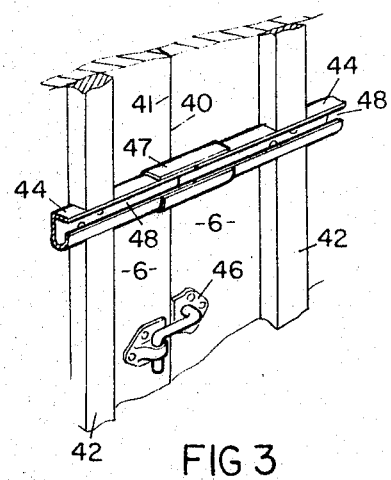
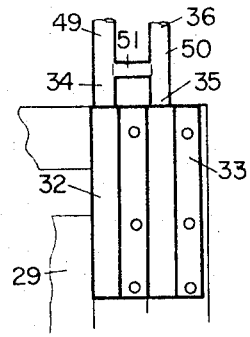
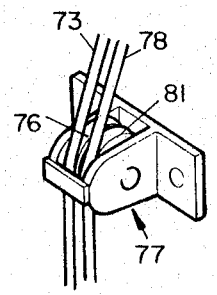
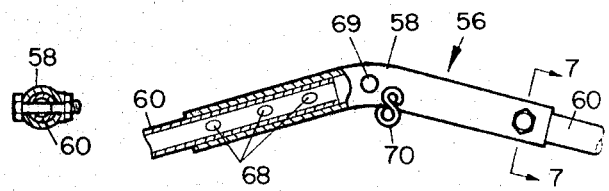
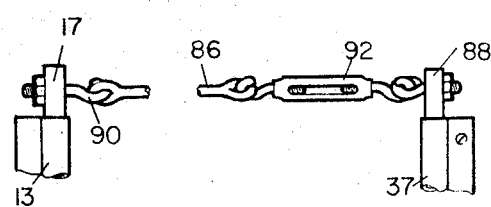
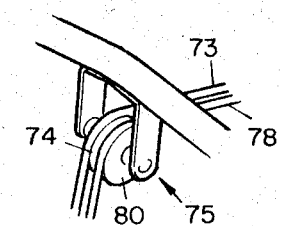
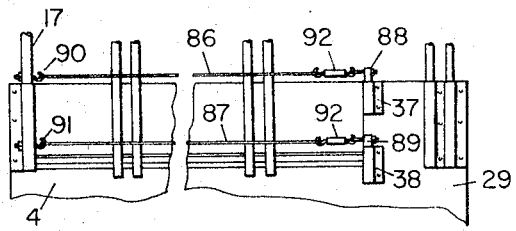

United States Patent Office 3,298,732
Patented Jan. 17, 1967

3,298,732
ADJUSTABLE COVERS FOR TRACTOR TRAILERS
AND THE LIKE
Alexander N. Openshaw, 36 Kinghigh Drive,
Concord, Ontario, Canada
Filed Oct. 20, 1965, Ser. No. 498,577
6 Claims. (Cl. 296—100)

This invention relates to improvements in Adjustable Covers for Tractor Trailers and the like.

It is well known in the art to provide flat bed trucks or tractor-trailers with stake sides to contain the load and thereafter to protect the load from the prevailing weather conditions by covering it with a large tarpaulin. This tarpaulin is generally supported overhead by transverse gable-like supports which extend between the stake sides to keep it clear of the load and to provide headroom for a person working inside and it is maintained in position by numerous tie-ropes and the like.

The disadvantages of this method of covering loads are chiefly due to the length of time required to fit the stake sides and gable supports, and thereafter to position the tarpaulin and tie it down, the latter task in particular generally requiring at least two men to accomplish. Another major disadvantage is due to the fact that each time access is required to the top or to the forward items of the load, the tarpaulin must be released and either removed or folded back, again wasting a great deal of delivery or turn round time.

In my co-pending application filed under Serial No. 466,353 I overcome these disadvantages by providing a device in which the gable supports were moveable over the length of the truck body and the tarpaulin was attached to these supports to make a retractable canopy so that movement of the gable supports in one direction would cause the tarpaulin to be folded in concertina-like fashion to expose the load and movement of the gable supports in the opposite direction would cause the tarpaulin to unfold to an extended condition to cover the load. Movement of the gable supports was effected by means of cables at each side running to double spool members. Although quite effective in operation, I have presently sought to improve my device by reducing the number of working parts and the length of cable required and also to provide gable supports which will continue to run smoothly although maintained more or less rigidly in their vertical planes.

The principal object of my invention is, therefore, to provide an adjustable cover for tractor-trailers and the like which will considerably reduce the time required to convert the flat bed of a trailer or truck to a stake-side container having a tarpaulin cover.

Another object of the instant invention is to provide an adjustable cover which, once fitted, will eliminate the necessity for further tying down or for releasing and retying when gaining access to the load.

Still another object of the invention is to provide an adjustable cover which can easily be operated by one person.

A further object of my invention is to provide an adjustable cover which will improve over my original device aforementioned by further simplifying the mechanism without detracting from its efficiency.

These and other objects and features of the invention will become readily apparent when the following description is read in conjunction with the drawings in which:

FIGURE 1 is a perspective view of a trailer having an adjustable cover of the present invention installed thereon, portions of the cover being broken away to disclose parts there-behind, FIGURE 2 is an enlarged, fractional, sectional end elevation of one side of the track portion of the invention, taken on the line 2—2 of FIGURE 1, FIGURE 3 is an enlarged, fragmentary perspective view of two abutting stake side sections, showing particularly the method of aligning the sucessive components of the track members, FIGURE 4 is an enlarged, fragmentary side view of an upper rear corner of the rearmost side sections, showing the method by which the fixed gable support is attached to the side sections, FIGURE 5 is an enlarged, fragmentary, perspective view of an intermediate guide pulley assembly fitted to the front wall of the trailer or truck, FIGURE 6 is a fractional, enlarged front view of the center portion of one of the moveable gable support pieces, part cut-away to illustrate the method by which it attaches to the outer portions of the gable support piece, FIGURE 7 is a sectional end elevation of the device of FIGURE 6, taken on the line 7—7.

FIGURE 8 is an enlarged, fractional side elevation of part of the strainer cable device utilized to maintain the stake side sections in close and rigid continuity, FIGURE 9 is a fractional side elevation of a modified structure in which each of the vehicle sides comprises a single wall running the full length of the vehicle along which runs a single track.

FIGURE 10 is an enlarged, fragmentary, perspective view of the upper guide pulley assembly as fitted to the fixed foremost gable support piece.

Figure 1:
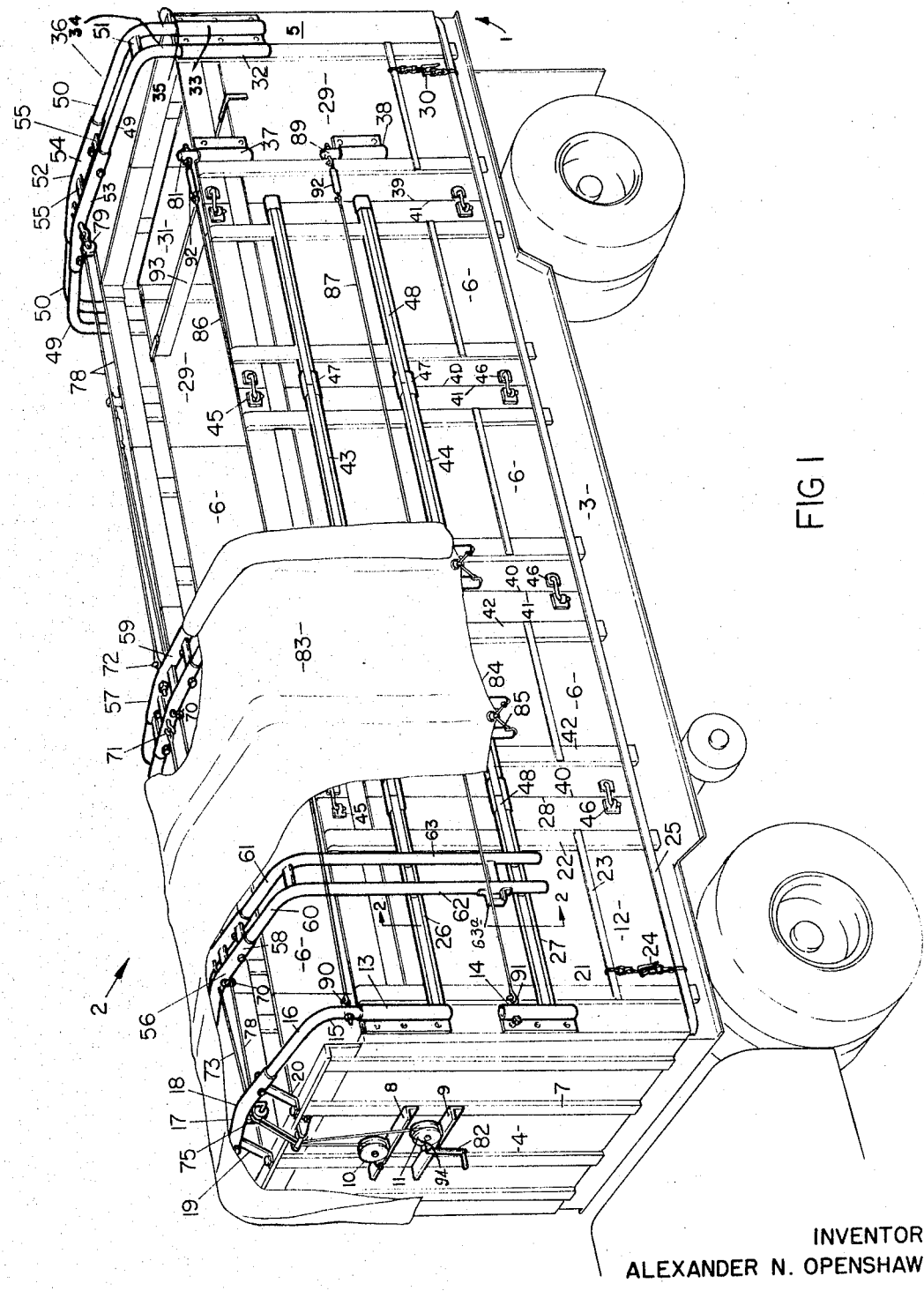

Referring to FIGURE 1, my invention comprises a stake side assembly 1 generally supporting an adjustable cover assembly 2 and mounted on the flat bed 3 of a trailer or truck.

The stake side assembly 1 includes a transverse front section 4, a tailgate section 5 and a plurality of intermediate side sections 6. The front section 4 is in the form of a transverse wall vertically ribbed at 7, the rib 7 extending down to fit into appropriate sockets in the bed 3 in the customary manner. Two short, horizontal girder supports 8 and 9 are attached to the front surface of the front section 4 and these in turn provide suitable support for a pair of spools 10 and 11 respectively. A side wall 12 extends rearwardly from each vertical edge of the front section 4 and upper and lower vertical, flanged, tubuler supports 13 and 14 are secured thereto, at the front edge thereof, in axial alignment, each of the upper supports 13 closely but slidably receiving the vertical lower ends 15 of the outer portions 16 of the front gable support 17. The center portion 18 of the gable support 17 is tubular and closely receives the inner ends of the outer portions 16 which are then bolted into position as shown. A pair of short stays 19 and 20 extend upwardly and rearwardly from the upper edge of the front section 4 to rigidly locate and support the center portion 18 of the gable support 17. The side walls 12 also include vertical ribs 21 and 22 which extend beyond the bottom edges of their side walls to enter the sockets in the truck or trailer bed 3 in the conventional manner. A lower horizontal bar 23 attached to ribs 21 and 22, provides the upper attachment for a securing chain 24 which passes around a longitudinal beam 25 forming part of the bed 3, and in this manner the assembly is firmly retained on the truck or trailer bed. Referring also to FIGURE 2, an upper horizontal track member 26 and a lower horizontal track member 27 are attached in parallel, spaced-apart relation to the side wall 12 and extend from the tubular supports 13 and 14 rearwardly to the rearmost edge 28 of the side wall 12.

The tailgate section 5 includes a pair of oppositely located side walls 29 at the rear of the bed 3 and attached thereto in a similar manner to that described for the front side walls 12, being retained thereon by a chain device 30. The rear loading doors 31 are attached to the rear edges of the side walls 29 in any conventional manner such as by hinges or the like.

Referring also to FIGURE 4, a pair of vertical, flanged tubes 32 and 33 are attached at the upper rear corners of the side walls 29 and these are adapted to closely receive the lower ends 34 and 35 respectively of a rear, fixed gantry support unit 36. Another pair of upper and lower vertical flanged tubes 37 and 38 respectively, in substantially axial alignment, are attached to the side walls 29 adjacent the front edges 39 thereof.

The intermediate side sections 6 are rectangular, having front edges 40 and rear edges 41, each section 6 having vertical ribs 42 which also extend down into sockets provided in the truck or trailer bed 3. Horizontal spaced apart upper and lower track members 43 and 44 respectively are attached to the sections 6, and upon the sections 6 being assembled to the truck bed 3 in conjunction with the front section 4 and the tailgate section 5, all the upper track members are adapted to be in full alignment with each other and with the upper track member 26 of the front side wall 12 as described. Similarly the lower track members 27 and 44 are all fully aligned. The unit is also designed to insure that upon assembly the adjoining front and rear edges of all the side walls 6, 12 and 29 are usbstantially contiguous and the side walls themselves coplanar.

Referring also to FIGURE 3, the side walls are joined together in edge-to-edge engagement by means of upper and lower latch devices 45 and 46 respectively, and the butting edges of the upper track members 43 and 26, and lower track members 44 and 27 are spanned by wrap-around connectors 47.

It should be noted that all the track members and their wrap-around connectors are of substantially rectangular, tubular section with a slot 48 running the length of the members and connectors.

The rear fixed gable support unit 36 comprises two pairs of outer portions 49 and 50 held in parallel spaced apart relation by cross bracings 51. The lower ends 34 and 35 of the portions 49 and 50 respectively are vertical and are adapted to fit in the tubular supports 32 and 33 as described, the remainder of the pairs of the outer portions extending inwardly and upwardly toward the centre of the truck or trailer assembly, where they are joined by means of a centre section 52 comprising two tubular pieces 53 and 54 held in parallel, spaced apart relationship by cross bracings 55 and adapted to slidably receive the inner ends of the outer portions 49 and 50 respectively, which are thereafter held in permanent engagement by bolt means.

A plurality of moving intermediate gable support units 56 and a rear moving gable support unit 57 are all generally similar to the rear fixed support unit 36 as heretofore described, the centre sections 58 of the intermediates units 56 and the centre section 59 of the rear unit 57 each supporting substantially identical pairs of outer portions 60 and 61, suitably cross-braced to maintain their parallelism and rigidity, and having extended vertical lower ends 62 and 63 respectively.

Suitable brackets 63a secured to the sides of the gable supports near their lower ends serve to hold adjacent supports from engagement with each other in the folded conditions of the tarpaulin.

Upper and lower axles 64 and 65 respectively extending radially inwardly from the lower ends 62 and 63 of the gable supports as illustrated in FIGURE 2, support upper and lower rollers 66 and 67 respectively, and the spacing between the axles is such that the rollers may run freely within their respective upper and lower track members 26 and 27, and 43 and 44 as described. The slots 48 in the track members allow the axles to move freely therein.

Referring also to FIGURES 6 and 7, the general arrangements of the central portion of the intermediate moving gable supports 56 is shown and it will be noted that a series of holes 68 through the inner ends of the outer portions 60 and 61 permit the overall width of the support to be selected to suit the width of the truck or trailer 3. It should be noted that the front and rear fixed gable supports 17 and 52 are similarly adjustable. A horizontal hole 69 is formed longitudinally and diametrically through the centre of the centre section 58 to form a clear passage for an operating cable, and a cable guide 70 is also attached to the centre section 58 to freely support another cable under the centre section 58.

The centre section 59 of the rear moving gable support unit 57 is similar to the centre sections 58 with the exception of there being front and rear cable attachment hooks 71 and 72 respectively extending outwardly therefrom, the shanks of the hooks passing through the holes 69 to be secured by nut means or the like at the inner surfaces.

From FIGURES 1, 5 and 10 it will be seen that a cable 73 extends from the front attachment hook 71 at the rear moving gable support unit 57 through the axially aligned holes 69 in the intermediate moving gable support units 56, around one sheave 74 of a double-sheaved pulley unit 75 attached to the underside of the centre section 18 of the front fixed gable support unit 17, thereafter being guided down the front surface of the front section 4 by one sheave 76 of a double-sheaved pulley unit 77 and thereafter attached to the spool 10.

A second cable 78 extends rearwardly from the rear hook 72 at the rear moving gable support unit 57 to pass around a pulley 79 attached to the front face of the centre section 54 of the rear fixed gable support unit 52. From the pulley 79 the cable 78 extends to the front of the vehicle, being supported by the cable guides 70 in the moving support units, and then passes over the second sheave 80 of the pulley unit 75 to extend down the front surface of the front section 4, passing over the second sheave 81 of the pulley unit 77 and thence to the spool 11 to which the end is attached.

A handle 82 is provided to permit the operator to wind either of the spools 10 or 11. Winding the spool 10 will shorten the cable 73 and draw the rear moving gable support unit 57 towards the front of the vehicle, while the cable 78 winds off the spool 11. Conversely, winding the spool 11 shortens the cable 78 and draws the support unit 57 to the rear of the vehicle while the cable 73 unwinds from its spool 10.

With the rear moving support unit 57 selected to its rearmost position, a tarpaulin 83 is suitably spread over the open top of the vehicle, its front edge secured to the front section 4 and its rear edge secured to the unit 57. The longitudinal edges 84 as shown in FIGURE 1, are tied to the bottom of the lower ends 62 and 63 of the moving support units, the latter being suitably perforated or slotted to accommodate the tie down ropes 85.

From the foregoing description it will be seen that upon the spool 10 being wound to its full extent, the rear moving gable support unit 57 will have moved forward as far as possible, pushing the intermediate support units 56 ahead of it and causing the canvas of the tarpaulin 83 to fold in a concertina-like manner.

Upon winding spool 11, the rearward movement of the support unit 57 pulls the canvas of the tarpaulin 83 and this is accompanied by resultant movement of the intermediate supports 56 until the spool 11 is wound to its fullest extent, at which time the support unit 57 is at the rear of the vehicle and the tarpaulin 83 stretched completely over the top of the vehicle.

Referring to FIGURES 1, 8 and 9, a preferred arrangement is shown of a method to gain longitudinal rigidity in which upper and lower strainer cables 86 and 87 respectively extend from solid pegs 88 and 89, adapted to be a close slide fit in the tubular portions 37 and 38 respectively of the rear side walls 29, forwardly to hooks 90 and 91 respectively, the former being attached to the front fixed cable support 17 and the latter to the lower tubular support 14 of the front section 4. Turn buckles 92 in each of the cables permit them to be suitably tensioned to compress all the stake side members in edge-to-edge contact.

A conventional pawl and ratchet mechanism, indicated at 94, is suitably mounted to coact with the pulley 11 whereby on the tarpaulin reaching its folded position the cable may be locked against further movement so that upon tensioning of the cable the tarpaulin will be firmly held backward and forward movement.

A cross bar 93 extends transversely between the upper edges of the rear side walls 29 to maintain their relative positions when the tailgate doors 31 are opened.

In FIGURE 9 a modified construction is shown in which each side of the vehicle is shown as consisting of a single wall running from end to end of the vehicle or in this case a single lengthwise uninterrupted track may be used.

This structure is found well adapted to light panel trucks.

While I have shown and described herein the presently preferred construction and arrangement of parts for carrying out the objects of my said invention, these are capable of variation and modification without departing from the spirit of the invention. I, therefore, do not wish to be limited to the precise details set forth herein but desire to avail myself of such variations and modifications as come within the scope of the appended claims.

What I claim is:

1. In an adjustabe cover for flat bed vehicles including a stake side assembly and a cover assembly; said stake side assembly including a transverse front section, a tailgate section and side sections; attachment means between said sections and said flat bed to maintain said sections substantially coplanar in upright engagement with said flat bed and in edge-to-edge engagement with each other; latch means between contiguous edges of said sections; upper and lower horizontal track members in parallel, spaced apart relation secured to each of said side sections, said upper and lower track members each being composed of endwise related sections, collars for connecting the meeting ends of adjacent sections to hold the sections of the back members in full longitudinal alignment on each side of said vehicle; said cover assembly including gable support units each comprising a pair of parallel vertical lower ends on each side of said vehilce, held in longitudinal spaced relation by cross bracing means, said lower ends supporting a pair of parallel, spaced apart, cross-braced gabled sections extending transversely across said vehicle; upper and lower axle means extending radially from each of said vertical lower ends, roller means rotatably supported by said axle means; said roller means being in freely rotatable engagement with their respective upper and lower track members to support said gable support unit in longitudinally moveable and transversely fixed relation with said vehicle and to maintain said gable support unit in a substantially vertical plane; said gable support units being arranged in longitudinal alignment on said track members and each being independently moveable; tarpaulin means supported by said gable units stretched between said front section at the one end, and the rearmost of said gable units at the other end upon said rearmost gable unit being located at the rear of said vehicle and the remaining gable units being substantially equispaced; flexible means attaching said tarpaulin to said gable units; and means for moving said rearmost gable unit longitudinally over said vehicle flat bed.

2. Adjustable cover means for flat bed vehicles as defined in claim 1, characterized by longitudinally adjustable strainer means extended along the sides of the vehicle and anchored at their ends to the side members, and means to adjust said strainer means lengthwise.

3. An adjustable cover for flat bed vehicles as defined in claim 1, in which said attachment means between said sections and said flat bed include vertical ribs integral with said sections, said ribs extending below the lower edges of said sections; said flat bed having a plurality of sockets formed therein and suitably spaced apart to closely receive the extending portions of said ribs; and releasable chain means extending between said flat bed and said sections maintaining said sections in firm engagement with said flat bed.

4. An adjustable cover for flat bed vehicles as defined in claim 1 in which said track members are tubular, having longitudinal slots running the full lengths thereof; said rollers running inside said tubular track members and said axles passing freely through said slots; wrap-around connectors extending between the contiguous edges of each of said adjacent track members; and each of said wrap-around connectors having a longitudinal slot running the full length thereof corresponding with the slots in said track members.

5. An adjustable cover for flat bed vehicles as defined in claim 1 in which said means for moving said rearmost gable unit includes a cable attached to the front face of said rearmost gable unit extending forwardly of said vehicle, pulley means secured to said front section to support said cable and guide it downwardly on said front section; spool means upon which said cable is windable and means for winding said cable onto said spool; a second cable extending rearwardly from the rear face of said rearmost gable, rear pulley means and rear pulley support means located adjacent said tailgate section; said second cable passing around said rear pulley to extend to the front of said vehicle; second pulley means secured to said front section to support said second cable and guide it downwardly on said front section; second spool means upon which said second cable is windable and means for winding said second cable onto said second spool; said second spool unwinding upon this first spool winding and said first spool unwinding upon said second spool winding.

6. An adjustable cover for flat bed vehicles as defined in claim 1 in which said side sections include a plurality of substantially identical subsections interconnected by said latch means and each separately attached to said flat bed.

References Cited by the Examiner

UNITED STATES PATENTS

| 1,263,759 | 4/1918 | Hanaway | 296—105 |
| 1,713,923 | 5/1929 | Schlicker | 296—105 |
| 2,603,171 | 7/1952 | Smith | 4—172 |
| 2,796,072 | 6/1957 | Smith | 4—172 |
| 3,231,305 | 1/1966 | Beckman | 296—100 |

FOREIGN PATENTS

| 95,116 | 4/1963 | Denmark. |
| 728,051 | 4/1955 | Great Britain. |

MILTON BUCHLER, *Primary Examiner.*

C. C. PARSONS, *Assistant Examiner.*